United States Patent
Zhang

(10) Patent No.: US 7,577,216 B2
(45) Date of Patent: Aug. 18, 2009

(54) GUARD INTERVAL AND FFT MODE DETECTOR IN DVB-T RECEIVER

(75) Inventor: Junling Zhang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 10/947,454

(22) Filed: Sep. 22, 2004

(65) Prior Publication Data

US 2005/0100118 A1    May 12, 2005

(30) Foreign Application Priority Data

Nov. 12, 2003    (KR)    ............ 10-2003-0079904

(51) Int. Cl.
*H04L 27/06*    (2006.01)
(52) U.S. Cl. .............. 375/343; 370/206; 370/208; 370/209; 370/210; 370/343; 370/252; 370/436; 370/503; 370/350; 375/260; 375/326; 375/344; 375/340; 375/350; 375/354
(58) Field of Classification Search ............ 375/343
See application file for complete search history.

(56) References Cited

U.S. PATENT DOCUMENTS 6,928,048 B1 *    8/2005    Do et al. ............... 370/208
2002/0186791 A1 *    12/2002    Foxcroft et al. ............. 375/324
2003/0117943 A1    6/2003    Sakata et al.
2004/0240379 A1    12/2004    Tsuie
2005/0265488 A1 *    12/2005    Jung ........................ 375/340

OTHER PUBLICATIONS

European Patent Application No. EP 1267536 to Foxcroft, having Publication date of Dec. 18, 2002.
European Patent Application No. EP 1416693 to Atungsiri et al., having Publication date of May 6, 2004.
Korean Patent Application No. 990003996 to Park, having Application date of Feb. 5, 1996 (w/ English Abstract page).
Japanese Patent No. JP2002204405 to Goji et al., having Publication date of Jul. 19, 2002 (w/ English Abstract page).

* cited by examiner

*Primary Examiner*—Shuwang Liu
*Assistant Examiner*—Dhaval Patel
(74) *Attorney, Agent, or Firm*—Monica H. Choi

(57) ABSTRACT

For determining FFT and GI (guard interval) modes within a receiver, a correlation signal is generated from an in-phase and quadrature (I/Q) stream. An plurality of GI mode division signals are generated by processing the correlation signal delayed by different delays. For each of the GI mode division signals, a respective peak-value position and a respective peak-value is determined to be used for determining the GI and FFT modes of the I/Q stream. The correlation calculator generates the correlation signal dependent on the FFT mode to minimize memory capacity and cost of the receiver.

25 Claims, 7 Drawing Sheets

US 7,577,216 B2

GUARD INTERVAL AND FFT MODE DETECTOR IN DVB-T RECEIVER

BACKGROUND OF THE INVENTION

This application claims priority to Korean Patent Application No. 2003-0079904, filed on Nov. 12, 2003, in the Korean Intellectual Property Office, the disclosure of which is incorporated herein in its entirety by reference.

1. Field of the Invention

The present invention relates generally to terrestrial digital video broadcasting (DVB-T) receivers, and more particularly, to a mode detector and method for determining a guard interval (GI) mode and a FFT mode of an I/Q (in-phase and quadrature) stream within a DVB-T receiver.

2. Description of the Related Art

In terrestrial digital video broadcasting (DVB-T), a high number of carrier signals are used with Orthogonal Frequency Division Multiplexing (OFDM) as defined by the IEEE 802.11 standard protocol, and as known to one of ordinary skill in the art of DVB-T technology. A data frame of a DVB-T transmission signal is comprised of 68 OFDM symbols with each symbol including 1705 active carriers in a 2K mode or 6817 active carriers in an 8K mode. The DVB-T standard defines the 2K mode and the 8K mode. More specifically, the 2K mode and the 8K mode, each commonly referred to as "a FFT mode", also dictate the size of an FFT active window processed by a DVB-T receiver.

Because terrestrial digital video broadcasting is over uncertain transmission paths, a guard interval is inserted into each OFDM symbol, as illustrated in FIG. 7. FIG. 7 illustrates an example OFDM symbol 702 in a series of OFDM symbols (with a previous OFDM symbol 704 and a next OFDM symbol 706 shown in FIG. 7). The example OFDM symbol 702 is comprised of an active symbol 708 and a guard interval 710. Typically, the guard interval 710 is formed by copying an end portion 712 of the OFDM symbol 702 to the guard interval portion 710.

Each OFDM symbol includes such a respective guard interval formed by copying a respective end portion of the OFDM symbol. Such guard intervals are used to correct for degradation to signal quality from reflections during transmission of the DVB-T transmission signal. For example, when tall objects such as buildings are in the transmission path, the DVB-T transmission signal may be reflected from such buildings such that the DVB-T transmission signal is received twice at a DVB-T receiver. The guard interval of each OFDM symbol is used for correcting for signal interference from such reflection of the DVB-T transmission signal.

However, the guard interval of each OFDM symbol is desired to be removed before the received DVB-T signal is further processed. Referring to FIG. 7, the length of the guard interval 710 is formed to be a fraction the length of the OFDM symbol 702. In particular, the length of the guard interval 710 is formed to be one of $\frac{1}{32}$, $\frac{1}{16}$, $\frac{1}{8}$, or $\frac{1}{4}$ of the length of the OFDM symbol 702. Such fractions define the GI (guard interval) mode of the DVB-T transmission signal.

When the DVB-T transmission signal is received as a bit stream at the DVB-T receiver, a FFT mode and a GI mode for the received bit stream is determined for removal of the guard interval of each OFDM symbol. Thereafter, an FFT (Fast Fourier Transform) is performed on the resultant bit stream using an active window size with 2K (2048) or 8K (8192) points according to the FFT mode.

A conventional DVB-T receiver is typically capable of performing an FFT with respect to a constant FFT mode and a GI mode. Therefore, the conventional DVB-T cannot perform an FFT on an input bit stream from a channel operating with changing operating modes. In this regard, Korean Patent No. KR10-0327373 discloses a conventional receiver capable of detecting a changing operating mode. Nevertheless, it is still desired to increase the precision of determining the FFT and GI modes of the bit stream with minimized cost of the DVB-T receiver.

SUMMARY OF THE INVENTION

Accordingly, a mode detector and method of the present invention determines a FFT mode and a GI mode that may vary depending on an input bit stream within a DVB-T receiver.

In one aspect of the present invention, in a mode detector and method for determining modes within a receiver, a correlation calculator generates a correlation signal from an in-phase and quadrature (I/Q) stream. In addition, a multi-sliding integrator generates a plurality of GI mode division signals from the correlation signal that is delayed with different delays. Furthermore, a plurality of peak value accumulators generates a respective peak-value position and a respective peak-value for each of the GI mode division signals. Additionally, a decision unit determines a GI mode and a FFT mode of the I/Q stream from the respective peak-value positions and the respective peak-values of the GI mode division signals. The correlation calculator is coupled to the decision unit to generate the correlation signal dependent on the FFT mode.

In an example embodiment of the present invention, each GI mode division signal corresponds to a respective possible GI mode of the I/Q stream.

In another embodiment of the present invention, the decision unit also determines a GI peak-value and a GI peak-value position of the I/Q stream from the respective peak-value positions and the respective peak-values of the GI mode division signals.

In an example embodiment of the correlation calculator, a decimation unit generates a decimated I/Q stream by sampling the I/Q stream by 1/M. A selector selects one of the I/Q stream or the decimated I/Q stream depending on the FFT mode to generate a selected I/Q stream. A delayer delays the selected I/Q stream to generate a delayed I/Q stream, and a multiplier multiplies the selected I/Q stream and the delayed I/Q stream to generate the correlation signal. In one example decimation unit, M is 4.

In an example embodiment of the multi-sliding integrator, a shift register delays the correlation signal by the different delays to generate a first delay signal, a second delay signal, a third delay signal, and a fourth delay signal. A first integration unit combines the first delay signal and the correlation signal to generate a first combined signal that is further combined with a previous first GI mode division signal to generate a current first GI mode division signal. A second integration unit combines the second delay signal and the correlation signal to generate a second combined signal that is further combined with a previous second GI mode division signal to generate a current second GI mode division signal.

In addition, a third integration unit combines the third delay signal and the correlation signal to generate a third combined signal that is further combined with a previous third GI mode division signal to generate a current third GI mode division signal. A fourth integration unit combines the fourth delay signal and the correlation signal to generate a fourth combined signal that is further combined with a previous fourth GI mode division signal to generate a current fourth GI mode division signal.

For example, the first, second, third, and fourth delay signals in the multi-sliding integrator are generated from the correlation signal being delayed by time periods of 64, 128, 256, and 512 samples, respectively.

In an example embodiment of each of the peak-value accumulators, a first complex magnitude calculator generates complex magnitudes of a GI mode division signal. A peak-value detector generates the respective peak-value position of the GI mode division signal by detecting a position where a peak value is present in the complex magnitudes. A pass-through unit selects a portion of the GI mode division signal that corresponds to the peak-value position to generate a pass-through signal. An adder combines the pass-through signal and a previous interim result to generate an adder output. A delayer delays the adder output to generate and store a delayed adder output that acts as the previous interim result for a next pass-through signal from the pass-through unit. A second complex magnitude calculator generates the respective peak-value of the GI mode division signal by determining a complex magnitude of the delayed adder output.

In an example embodiment of the decision unit, a FFT mode detector determines the FFT mode from one of the respective peak-values. A peak-value detector determines a maximum of the respective peak-values for generating the GI peak value and the GI mode. A selector selects one of the respective peak-value positions corresponding to the maximum of the respective peak-values for generating the GI peak-value position.

In one example embodiment, the FFT mode detector uses the respective peak-value for the GI mode division signal corresponding to a GI of $1/16$. In another example embodiment, the FFT mode is one of a 2K mode or an 8K mode, and the GI mode is one of $1/4$, $1/8$, $1/16$, or $1/32$, for the mode detector disposed within a DVB-T receiver.

In another aspect of the present invention, for a digital video broadcasting receiver, an I/Q generator generates an in-phase and quadrature (I/Q) stream from an input bit stream based on a number-controlled oscillation signal and sampling frequency information. A GI removal unit removes a GI (guard interval) from the I/Q stream based on first symbol timing information and second symbol timing information. An FFT unit performs an FFT on the I/Q stream having the GI removed, to generate a transformed I/Q stream.

In addition, a mode detector determines a GI mode, a FFT mode, a GI peak-value, and a GI peak-value position for the I/Q stream by using a correlation signal dependent on the FFT mode. A first symbol timing recovery unit generates the first symbol timing information depending on the GI mode, the FFT mode, and the GI peak-value position. A second symbol timing and sampling frequency recovery unit generates the second symbol timing information and the sampling frequency information depending on the transformed I/Q stream.

Furthermore, a first carrier recovery unit generates first carrier recovery information in response to the GI peak-value, and a second carrier recovery unit generates second carrier recovery information from the transformed I/Q stream. An adder combines the first and second carrier recovery information to generate oscillation control information, and a number-controlled oscillator generates the number-controlled oscillation signal in response to the oscillation control information.

In this manner, the mode detector for the DVB-T receiver determines the FFT mode and the GI mode that may vary depending on the input bit stream. In addition, the initial correlation signal used by the mode detector is generated depending on the FFT mode such that a number of data samples is maintained within a range for minimizing memory capacity and in turn cost of the mode detector.

BRIEF DESCRIPTION OF THE DRAWINGS

The above and other aspects and advantages of the present invention will become more apparent when described in detail for example embodiments with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

Figure 1:
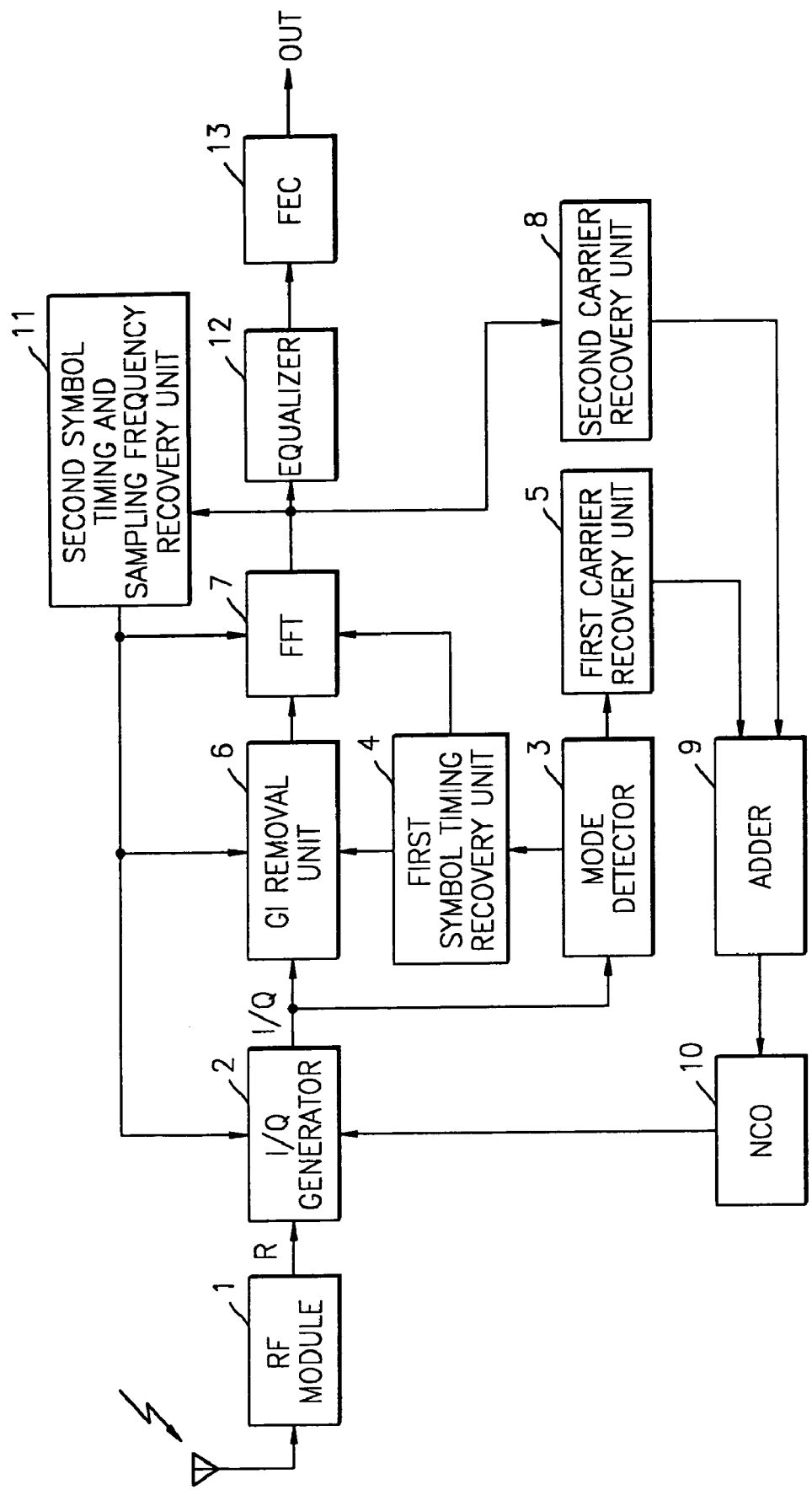
FIG. 1 is a block diagram of a digital video broadcasting-terrestrial (DVB-T) receiver, according to an embodiment of the present invention.

FIG. 1 is a block diagram of a terrestrial digital video broadcasting (DVB-T) receiver according to an embodiment of the present invention. Referring to FIG. 1, the DVB-T receiver includes a Radio Frequency (RF) module 1, an I/Q generator 2, a mode detector 3, a first symbol timing recovery unit 4, a first carrier recovery unit 5, a GI removal unit 6, an FFT unit 7, a second carrier recovery unit 8, an adder 9, a number-controlled oscillator (NCO) 10, and a second symbol timing and sampling frequency recovery unit 11.

The RF module 1 receives a wireless terrestrial signal from an allocated channel, generates a baseband OFDM analog signal, converts the OFDM analog signal into a digital signal, and outputs the digital signal as an input bit stream R. The I/Q generator 2 generates an in-phase and quadrature (I/Q) stream from the input bit stream R using a number-controlled oscillation signal and sampling frequency information output from the second symbol timing and sampling frequency recovery unit 11. The number-controlled oscillation signal is output from the NCO 10.

The GI (guard interval) removal unit 6 removes a GI (guard interval) for each OFDM symbol of the I/Q stream based on first symbol timing information and the second symbol timing information to generate a resultant I/Q stream to the FFT unit 7. The FFT unit 7 performs a FFT (fast Fourier transform) on the resultant I/Q stream based on the first and second symbol timing information to generate a transformed I/Q stream.

The mode detector 3 determines a GI mode (GI_MODE), a FFT mode (FFT_MODE), a GI peak-value (PEAK_VAL), and a GI peak-value position (PEAK_POS) for the I/Q stream. The first symbol timing recovery unit 4 generates the first symbol timing information in response to the GI mode, the FFT mode, and the GI peak-value position, as determined by the mode detector 3. The second symbol timing and sampling frequency recovery unit 11 extracts the second symbol timing information and the sampling frequency information from the transformed I/Q stream generated by the FFT unit 7.

Here, the first symbol timing information specifies coarse symbol timing, and the second symbol timing information specifies fine symbol timing. A sampling signal used for generating the I/Q stream by the I/Q generator 2 is synchronized with the sampling frequency information.

The first carrier recovery unit 5 generates first carrier recovery information in response to the GI peak-value as generated from the mode detector 3. The second carrier recovery unit 8 extracts second carrier recovery information from the transformed I/Q stream. The first carrier recovery information includes fractional carrier recovery information, and the second carrier recovery information includes integer sub-carrier recovery information and other fractional carrier recovery information.

The adder 9 combines the first and second carrier recovery information to generate oscillation control information. The NCO 10 generates and outputs the number-controlled oscillation signal in response to the oscillation control information from the adder 9. The number-controlled oscillation signal from the NCO 10 is used for adjusting the sampling frequency within the I/Q generator 2 for generating the I/Q stream.

Control with such feed-back information from the NCO 10, the first symbol timing recovery unit 4, and the second symbol timing and sampling frequency recovery unit 11 ensures proper sampling and synchronization for accurately extracting transmitted DVB-T data within the DVB-T receiver of FIG. 1. In addition, the DVB-T receiver of FIG. 1 further includes an equalizer 12 and a forward error correction unit (FEC) 13. The equalizer 12 further compensates for signal degradation from the transformed I/Q stream generated by the FFT unit 7. The FEC unit 13 further corrects for errors in the I/Q stream from the equalizer 12 using Viterbi soft decoding and Reed Solomon (RS) error correction algorithms. A signal output from the FEC unit 13 has MPEG (Moving Picture Experts Group) coded data format to be processed by a digital signal processing circuit and decoded into data that is to be displayed for DVB-T.

Figure 2:
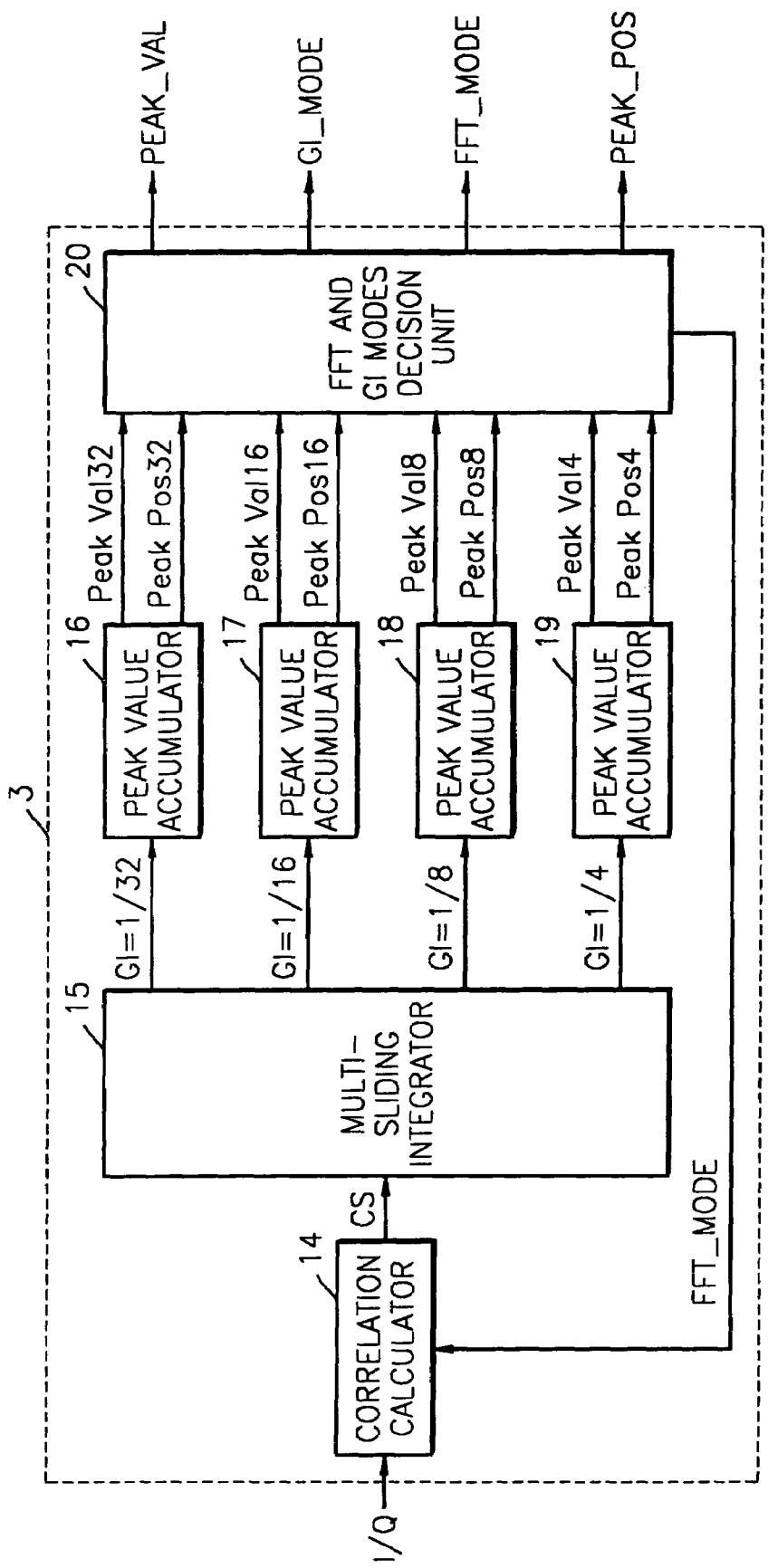
FIG. 2 is a block diagram of a mode detector of FIG. 1, according to an embodiment of the present invention.

FIG. 2 is a block diagram for an example implementation of the mode detector 3 of FIG. 1. Referring to FIG. 2, the mode detector 3 includes a correlation calculator 14, a multi-sliding integrator 15, a plurality of peak value accumulators 16, 17, 18, and 19, and an FFT and GI modes decision unit 20.

Referring to FIG. 2, the correlation calculator 14 processes the I/Q stream from the I/Q generator 2 based on the FFT mode from the decision unit 20 to generate a correlation signal CS. The multi-sliding integrator 15 delays the correlation signal CS by different amounts of delay to generate different delay signals that are used to further generate GI mode division signals GI=1/32, GI=1/16, GI=1/8, and GI=1/4. Each of such GI mode division signals is for a respective GI mode of 1/32, 1/16, 1/8, and 1/4, respectively.

Further referring to FIG. 2, each of the peak-value accumulators 16, 17, 18, and 19 processes a respective one of the GI mode division signals GI=1/32, GI=1/16, GI=1/8, and GI=1/14 to generate a respective one of peak-value positions Peak Pos32, Peak Pos16, Peak Pos8, and Peak Pos4, and a respective one of peak-values Peak Val32, Peak Val16, Peak Val8, and Peak Val4. The FFT and GI modes decision unit 20 determines the GI mode GI_MODE, the FFT mode FFT_MODE, the GI peak-value PEAK_VAL, and the GI peak-value position PEAK_POS of the I/Q stream, using the respective peak-value positions Peak Pos32, Peak Pos16, Peak Pos8, and Peak Pos4 and the respective peak-values Peak Val32, Peak Val16, Peak Val8, and Peak Val4 from the peak value accumulators 16, 17, 18, and 19.

Figure 3:
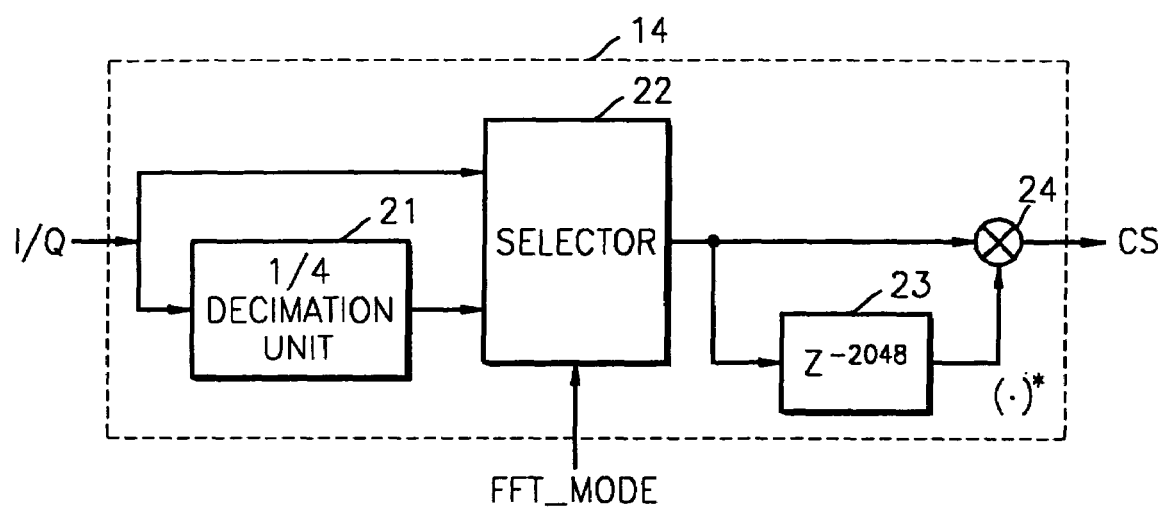
FIG. 3 is a block diagram of a correlation calculator of FIG. 2, according to an embodiment of the present invention.

FIG. 3 is a block diagram of an example embodiment of the correlation calculator 14 of FIG. 2. Referring to FIG. 3, the correlation calculator 14 includes a decimation unit 21, a selector 22, a delayer 23, and a multiplier 24. The decimation unit 21 passes through one of four samples of the I/Q stream, to generate a decimated I/Q stream. The selector 22 selects one of the decimated I/Q stream from the decimation unit 21 or the original I/Q stream from the I/Q generator 2 depending on a logic state of the FFT mode FFT MODE determined by the decision unit 20, to generate a selected I/Q stream.

Further referring to FIG. 3, the delayer 23 delays the selected I/Q stream from the selector 22 by a time period for 2048 samples to generate a delayed I/Q stream that is a conjugate signal. The size of memory used by the delayer 23 is $2048 \ast n_{corr}$, where $n_{corr}$ denotes a bit number of the I/Q stream. The multiplier 24 multiplies the selected I/Q stream from the selector 22 with the delayed I/Q stream from the delayer 23 to generate the correlation signal CS.

For the case when the FFT mode for the I/Q stream is 8K mode, the decimation unit 21 is used to make a symbol duration be the same as a symbol duration of a 2K mode from 1/4 decimation of the stream I/Q. For instance, if the FFT mode of the I/Q stream is the 8K mode, a symbol duration is 8448 with an example active OFDM symbol duration of 8192 samples and an example GI (guide interval) duration of 256 samples for an example GI mode of 1/32. In that example case, the output of the 1/4 decimation unit 21 has a symbol duration of 2112. The symbol duration value 2112 is comprised of an active OFDM symbol duration of 2048 and an example GI of 64 samples for the example GI mode of 1/32.

In one example embodiment of the present invention, the selector 22 selects the decimated I/Q stream from the decimation unit 21 to generate the selected I/Q stream if the FFT mode is 8K. Alternatively, the selector 22 selects the original I/Q stream from the I/Q generator 2 to generate the selected I/Q stream if the FFT mode is 2K.

Figure 4:
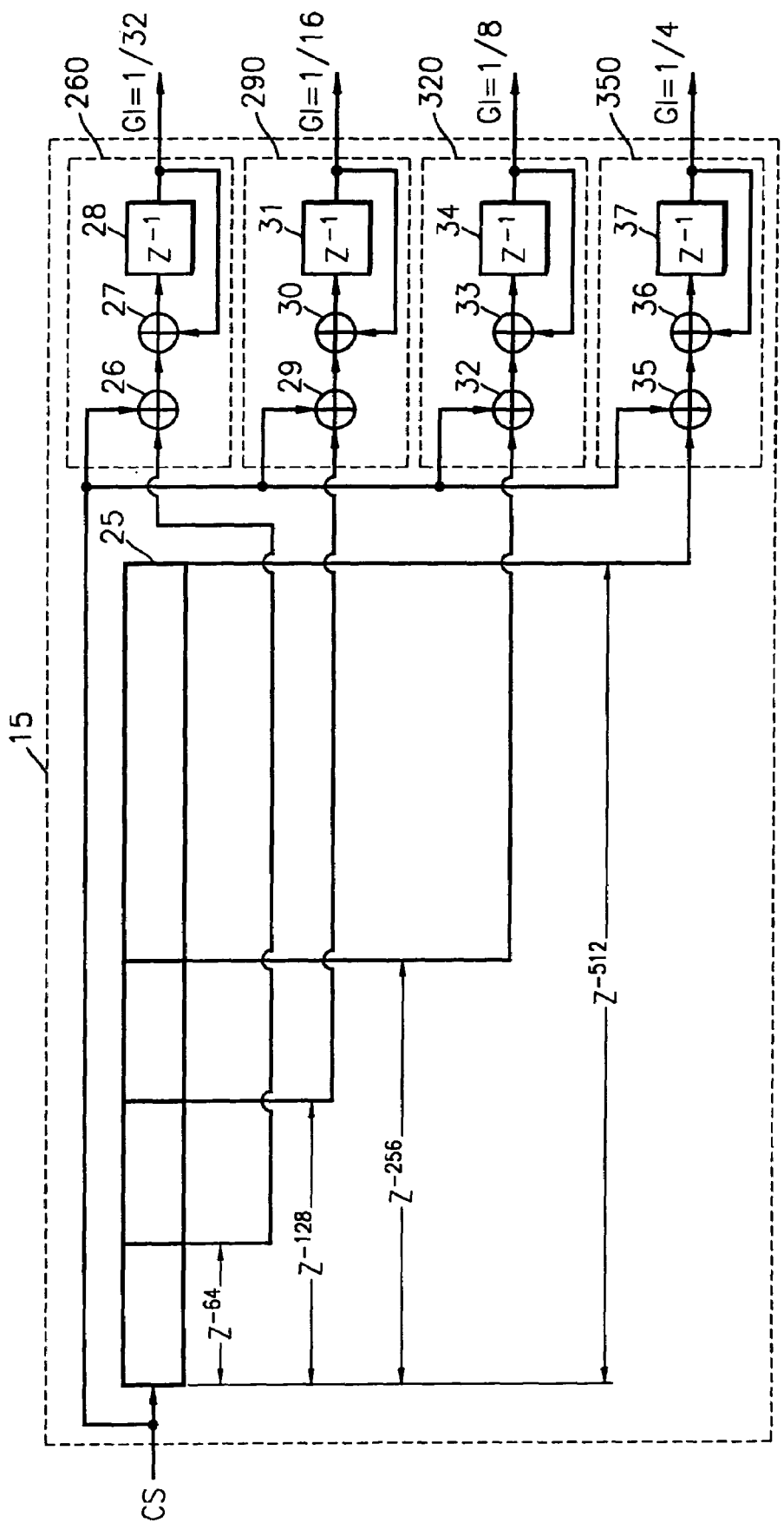
FIG. 4 is a block diagram of a multi-sliding integrator of FIG. 2, according to an embodiment of the present invention.

FIG. 4 is a block diagram of an embodiment of the multi-sliding integrator 15 of FIG. 2. Referring to FIG. 4, the multi-sliding integrator includes a shift register 25, a first integration unit 260, a second integration unit 290, a third integration unit 320, and a fourth integration unit 350. The shift register 25 delays the correlation signal CS from the correlation calculator 14 to generate first, second, third, and fourth delay signals. The size of memory used by the shift register 25 is $512 \ast n_{MSTR}$, where $n_{MSTR}$ denotes a bit number of the correlation signal CS, in one embodiment of the present invention.

The first delay signal is generated from delaying the correlation signal CS for a time period of 64 samples ($Z^{-64}$). The delay $Z^{-64}$ corresponds to the case where the GI mode is 1/32 in the 2K FFT mode. The second delay signal is generated from delaying the correlation signal CS for a time period of 128 samples ($Z^{-128}$). The delay $Z^{-128}$ corresponds to the case where the GI mode is 1/16 in the 2K FFT mode.

Similarly, the third delay signal is generated from delaying the correlation signal CS for a time period of 256 samples ($Z^{-256}$). The delay $Z^{-256}$ corresponds to the case where the GI mode is 1/8, in the 2K FFT mode. The fourth delay signal is generated from delaying the correlation signal CS for a time period of 512 samples ($Z^{-512}$). The delay $Z^{-512}$ corresponds to the case where the GI mode is 1/4 in the 2K FFT mode.

Each of the first, second, third, and fourth integration units 260, 290, 320, and 350 includes a respective set of two adders and a delayer. The first integration unit 260 combines the first delay signal (delayed by $Z^{-64}$) and the correlation signal CS (at an adder 26) to generate a first combined signal that is further combined (at an adder 27) with a previous first GI mode division signal (GI=1/32 through a delayer 28) to generate a current first GI mode division signal GI=1/32 as the output of the first integration unit 260.

Similarly, the second integration unit 290 combines the second delay signal (delayed by $Z^{-128}$) and the correlation signal CS (at an adder 29) to generate a second combined signal that is further combined (at an adder 30) with a previous second GI mode division signal (GI=1/16 through a delayer 31) to generate a current second GI mode division signal GI=1/16 as the output of the second integration unit 290.

Also, the third integration unit 320 combines the third delay signal (delayed by $Z^{-256}$) and the correlation signal CS (at an adder 32) to generate a third combined signal that is further combined (at an adder 33) with a previous third GI mode division signal (GI=1/8 through a delayer 34) to generate a current third GI mode division signal GI=1/8 as the output of the third integration unit 320.

Finally, the fourth integration unit 350 combines the fourth delay signal (delayed by $Z^{-512}$) and the correlation signal CS (at an adder 35) to generate a fourth combined signal that is further combined (at an adder 36) with a previous fourth GI mode division signal (GI=1/4 through a delayer 37) to generate a current fourth GI mode division signal GI=1/4 as the output of the fourth integration unit 350.

Figure 5:
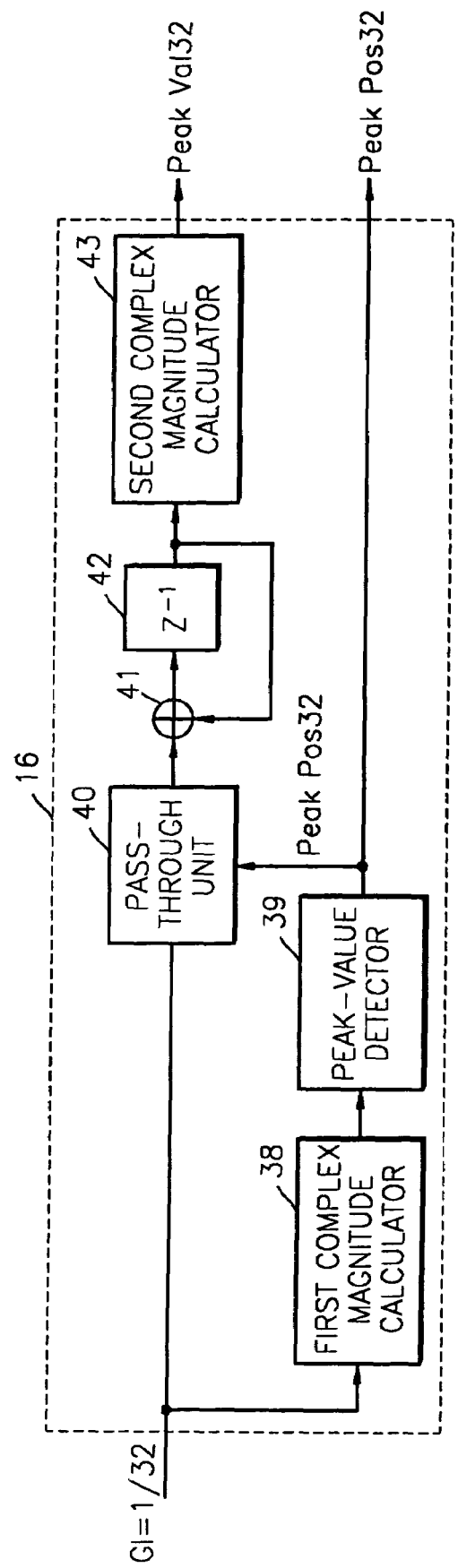
FIG. 5 is a block diagram of a peak value accumulator of FIG. 2, according to an embodiment of the present invention.

FIG. 5 is a block diagram of an embodiment of the peak-value accumulator 16 processing the first GI mode division signal GI=1/32. The other peak-value accumulators 17, 18, and 19 are implemented similarly for processing a respective one of the second, third, and fourth GI mode division signals GI=1/16, GI=1/8, GI=1/4, respectively.

Referring to FIG. 5, the peak-value accumulator 16 includes a first complex magnitude calculator 38, a peak-value detector 39, a pass-through unit 40, an adder 41, a delayer 42, and a second complex magnitude calculator 43. The first complex magnitude calculator 38 calculates complex magnitudes of the GI mode division signal GI=1/32. The peak-value detector 39 detects a position where a peak value is present in the calculated complex magnitudes to generate the peak-value position information Peak Pos32.

In general, a peak value is present in a symbol duration. Thus, the peak value occurs within a symbol duration such that the peak-value position occurs at a fraction of the symbol duration.

The pass-through unit 40 passes through a portion of the GI mode division signal G/I=1/32 corresponding to the peak-value position Peak Pos 32 to generate a pass-through signal. The adder 41 combines the pass-through signal from the pass-through unit 40 and a previous interim result stored in the delayer 42 to generate a combined signal. The delayer 42 stores the combined signal to be output after a symbol duration as an interim result that is combined with a next pass-through signal from the pass-through unit 40 in the adder 41.

In one embodiment of the present invention, the interim result stored in the delayer 42 is accumulated for a total number Nsym of peak value(s) for Nsym durations. Here, the total number Nsym may be 1, or alternatively may be 6 or 8 to be more robust for a Additive White Gaussian Noise (AWGN) channel, a static and dynamic Rayleigh channel, or a single frequency network channel. The second complex magnitude calculator 43 calculates the complex magnitude of the interim result from the delayer 42 to generate the peak-value Peak Val32.

Other peak-value accumulators 17, 18, and 19 are implemented similarly for generating a respective one of the peak-values Peak Val16, Peak Val8, and Peak Val4, respectively, and a respective one of the peak-value positions Peak Pos16, Peak Pos8, and Peak Pos4, respectively, from processing a respective one of the second, third, and fourth GI mode division signals GI=1/16, GI=1/8, and GI=1/4,respectively.

The peak-values Peak Val32, Peak Val16, Peak Val8, and Peak Val4 are output as four different values when the correlation calculator 14 of FIG. 2 is set with the proper FFT mode of the I/Q stream. However, when the correlation calculator 14 is set with an improper FFT mode, the peak-values Peak Val32, Peak Val16, Peak Val8, and Peak Val4 are output as small values corresponding to noise. Such a feature of the peak-value accumulators 16, 17, 18, and 19 is used for determining the FFT mode of the I/Q stream as described below.

Figure 6:
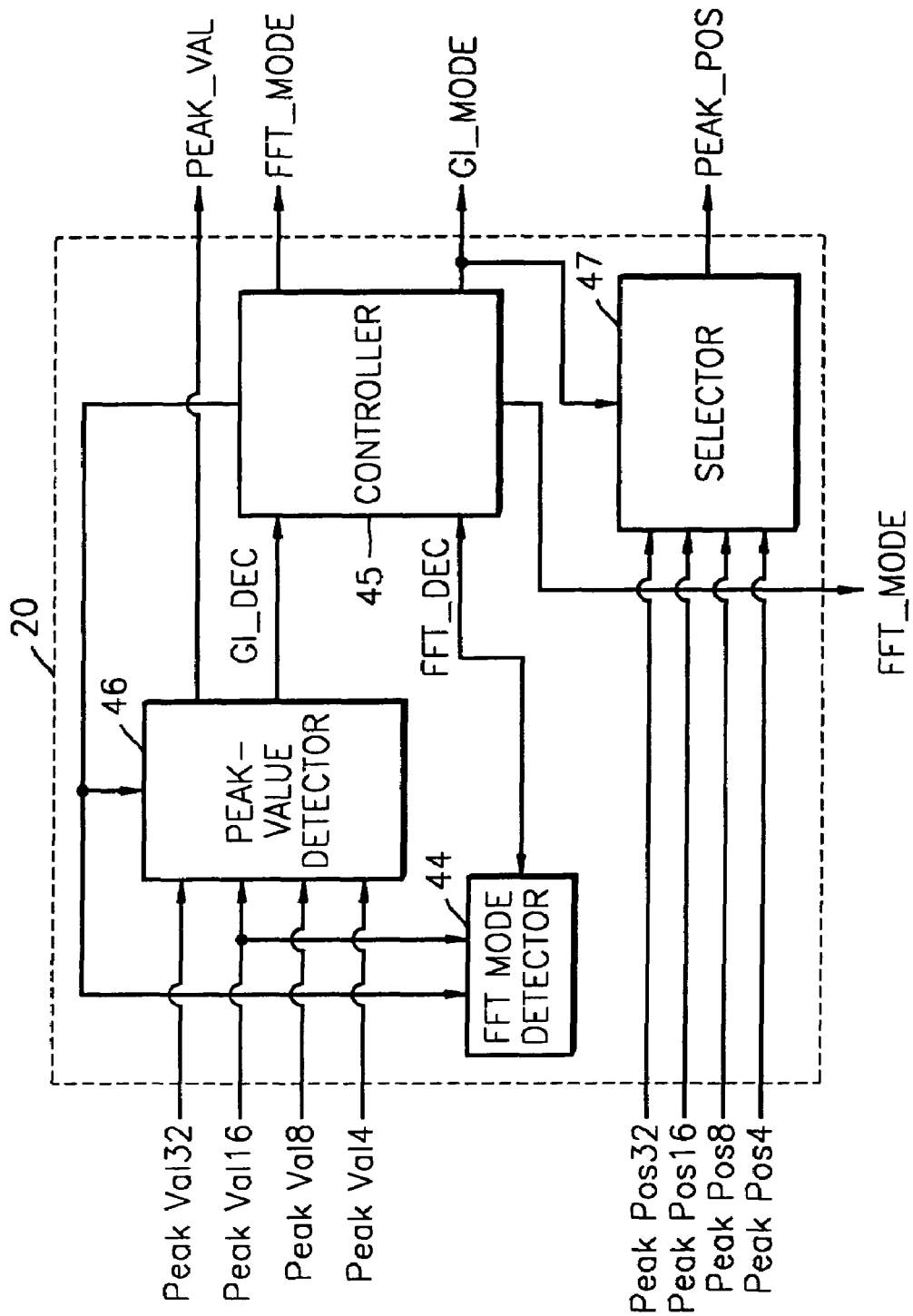
FIG. 6 is a block diagram of a FFT and GI modes decision unit of FIG. 2, according to an embodiment of the present invention.
Figure 7:
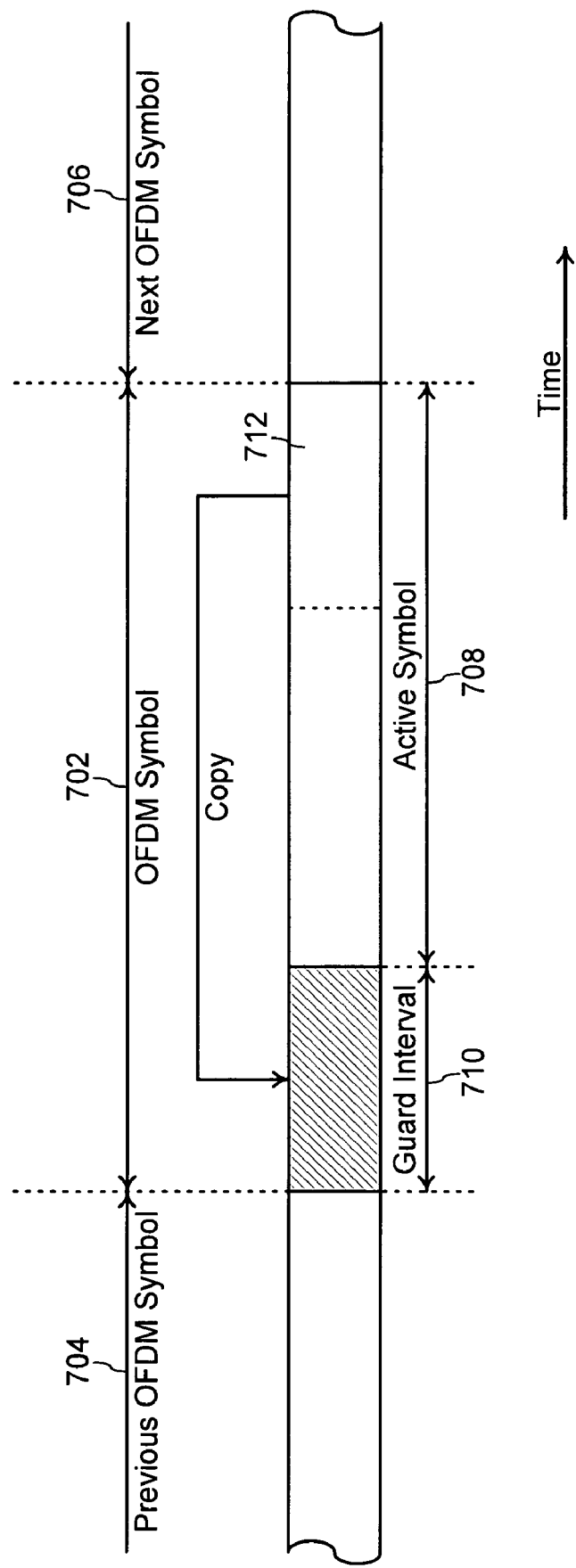
FIG. 7 illustrates OFDM symbols of a DVB-T transmission signal having a guard interval inserted in each OFDM symbol.

A block diagram for an example embodiment of the FFT and GI modes decision unit 20 of FIG. 2 is illustrated in FIG. 6. Referring to FIG. 6, the decision unit 20 includes a FFT mode detector 44, a peak-value detector 46, a controller 45, and a selector 47.

The FFT mode detector 44 generates a FFT mode decision signal FFT_DEC using one of the peak-values Peak Val32, Peak Val16, Peak Val8, and Peak Val4 to indicate the 2K mode or the 8K mode. The peak-value input to the FFT mode detector 44 is the peak-value Peak Val16 from the second peak-value accumulator 17 that processes the second GI mode division signal GI=1/16, in one embodiment of the present invention. Such a peak-value used by the FFT mode detector 44 is a maximum among the GI mode division signals GI=1/32, GI=1/16, GI=1/8, and GI=1/4, in one embodiment of the present invention.

The FFT mode decision signal FFT_DEC is determined by comparing the peak-value Peak Val16 resulting when the I/Q stream does not pass through the decimation unit 21 of the correlation calculator 14 (i.e., when the FFT mode FFT_MODE indicates the 2K mode), and the peak-value Peak Val16 resulting when the I/Q stream passes through the decimation unit 21 (i.e., when the FFT mode FFT_MODE indicates the 8K mode).

In other words, the peak-value Peak Val16 for the 2K mode is compared with the peak-value Peak Val16 for the 8K mode with Nsym=1. Then, the operating mode, i.e., the 2K mode or the 8K mode, corresponding to the peak-value Peak Val16 with a larger value is determined to be the FFT mode of the I/Q stream. The controller 45 uses the FFT mode decision signal FFT_DEC to set the FFT mode FFT_MODE to indicate one of 2K mode or 8K mode corresponding to the I/Q stream.

In addition to FFT mode detection, the peak-value detector 46 determines a maximum of the peak-values Peak Val32, Peak Val16, Peak Val8, and Peak Val4 to generate a decision signal GI_DEC corresponding to such a maximum. The decision signal GI_DEC indicates that the GI (guard interval) of the I/Q stream is one of 1/4, 1/8, 1/16, or 1/32 corresponding to the maximum of the peak-values Peak Val32, Peak Val16, Peak Val8, and Peak Val4. The controller 45 uses the decision signal GI_DEC to set the GI mode GI_MODE to indicate one of 1/4, 1/8, 1/16, or 1/32.

Additionally, the maximum one of the peak-values Peak Val32, Peak Val16, Peak Val8, and Peak Val4 is output as the GI peak value, PEAK_VAL from the decision unit 20. Furthermore, the selector 47 selects one of the peak-value positions Peak Pos32, Peak Pos16, Peak Pos8, and Peak Pos4 corresponding to the set GI mode GI_MODE as the GI peak value position, PEAK_POS, from the decision unit 20.

In this manner, the DVB-T receiver according to an embodiment of the present invention includes the mode detector 3 capable of quickly and precisely detecting and outputting the GI mode GI_MODE, the FFT mode FFT_MODE, the peak-value PEAK_VAL, and the peak-value position PEAK_POS for the I/Q stream. Also, the DVB-T receiver calculates coarse symbol timing information, fine symbol timing and sampling frequency information, fractional carrier recovery information, and fine carrier recovery information using the GI mode GI_MODE, the FFT mode FFT_MODE, the peak-value PEAK_VAL, and the peak-value position PEAK_POS, thereby improving demodulation of the OFDM signal.

Furthermore, the correlation calculator 14 of FIG. 3 generates the correlation signal CS having a lower sampling rate for the 2K mode when the I/Q stream is either of the 2K or 8K FFT mode. Thus, the memory capacity of the DVB-T receiver is minimized while accommodating both the 2K or 8K FFT mode, in turn minimizing cost of the DVB-T receiver.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A mode detector within a receiver, comprising:
    a correlation calculator that generates a correlation signal from an in-phase and quadrature (I/Q) stream;
    a multi-sliding integrator that generates a plurality of GI mode division signals by in part delaying the correlation signal with different delays;
    a plurality of peak value accumulators that generates a respective peak-value position and a respective peak-value for each of the GI mode division signals; and
    a decision unit that determines a GI mode and a FFT mode of the I/Q stream from the respective peak-value positions and the respective peak-values of the GI mode division signals;
    wherein the correlation calculator is coupled to the decision unit to generate the correlation signal dependent on the FFT mode as indicated by a FFT mode signal from the decision unit,
    and wherein the multi-sliding integrator operates without the FFT mode signal being directly fed-back to the multi-sliding integrator,
    and wherein the correlation calculator comprises:
    a decimation unit that generates a decimated I/Q stream by sampling the I/Q stream by 1/M; and
    a selector that selects one of the I/Q stream or the decimated I/Q depending on the FFT mode to generate a selected I/Q stream.

2. The mode detector of claim 1, wherein each GI mode division signal corresponds to a respective possible GI mode of the I/Q stream.

3. The mode detector of claim 1, wherein the decision unit also determines a GI peak-value and a GI peak-value position of the I/Q stream from the respective peak-value positions and the respective peak-values.

4. The mode detector of claim 1, wherein the multi-sliding integrator comprises:
    a shift register that delays the correlation signal by the different delays to generate a first delay signal, a second delay signal, a third delay signal, and a fourth delay signal;
    a first integration unit that combines the first delay signal and the correlation signal to generate a first combined signal, and that combines the first combined signal and a previous first GI mode division signal to generate a current first GI mode division signal;
    a second integration unit that combines the second delay signal and the correlation signal to generate a second combined signal, and that combines the second combined signal and a previous second GI mode division signal to generate a current second GI mode division signal;
    a third integration unit that combines the third delay signal and the correlation signal to generate a third combined signal, and that combines the third combined signal and a previous third GI mode division signal to generate a current third GI mode division signal; and
    a fourth integration unit that combines the fourth delay signal and the correlation signal to generate a fourth combined signal, and that combines the fourth combined signal and a previous fourth GI mode division signal to generate a current fourth GI mode division signal.

5. The mode detector of claim 4, wherein the first, second, third, and fourth delay signals are generated from the correlation signal being delayed by time periods of 64, 128, 256, and 512 samples, respectively.

6. The mode detector of claim 1, wherein each of the peak-value accumulators comprises:
    a first complex magnitude calculator that generates complex magnitudes of a GI mode division signal;
    a peak-value detector that generates the respective peak-value position of the GI mode division signal by detecting a position where a peak value is present in the complex magnitudes;
    a pass-through unit that selects a portion of the GI mode division signal that corresponds to the peak-value position to generate a pass-through signal;
    an adder that combines the pass-through signal and a previous interim result to generate an adder output;
    a delayer that delays the adder output to generate and store a delayed adder output that acts as the previous interim result for a next pass-through signal from the pass-through unit; and
    a second complex magnitude calculator that generates the respective peak-value of the GI mode division signal by determining a complex magnitude of the delayed adder output.

7. The mode detector of claim 1, wherein the decision unit comprises:
    a FFT mode detector that determines the FFT mode from one of the respective peak-values;
    a peak-value detector that determines a maximum of the respective peak-values for generating the GI peak value and the GI mode; and
    a selector that selects one of the respective peak-value positions corresponding to the maximum of the respective peak-values for generating the GI peak-value position.

8. The mode detector of claim 7, wherein the FFT mode detector uses the respective peak-value for the GI mode division signal corresponding to a GI of $\frac{1}{16}$.

9. The mode detector of claim 1, wherein the FFT mode is one of a 2K mode or an 8K mode, and wherein the GI mode is one of $\frac{1}{4}$, $\frac{1}{8}$, $\frac{1}{16}$, or $\frac{1}{32}$, for the mode detector disposed within a DVB-T (terrestrial digital video broadcasting) receiver.

10. The mode detector of claim 1, wherein the correlation calculator further comprises:
    a delayer that delays the selected I/Q stream to generate a delayed I/Q stream; and
    a multiplier that multiplies the selected I/Q stream and the delayed I/Q stream to generate the correlation signal.

11. A mode detector within a receiver, comprising:
a correlation calculator that generates a correlation signal from an in-phase and quadrature (I/Q) stream;
a multi-sliding integrator that generates a plurality of GI mode division signals by in part delaying the correlation signal with different delays;
a plurality of peak value accumulators that generates a respective peak-value position and a respective peak-value for each of the GI mode division signals; and
a decision unit that determines a GI mode and a FFT mode of the I/Q stream from the respective peak-value positions and the respective peak-values of the GI mode division signals;
wherein the correlation calculator is coupled to the decision unit to generate the correlation signal dependent on the FFT mode, and wherein the correlation calculator comprises:
a decimation unit that generates a decimated I/Q stream by sampling the I/Q stream by 1/M;
a selector that selects one of the I/Q stream or the decimated I/Q stream depending on the FFT mode to generate a selected I/Q stream; a delayer that delays the selected I/Q stream to generate a delayed I/Q stream; and a multiplier that multiplies the selected I/Q stream and the delayed I/Q stream to generate the correlation signal.

12. The mode detector of claim 11, wherein M is 4.

13. A method of determining modes within a receiver, comprising:
generating a correlation signal from an in-phase and quadrature (I/Q) stream depending on a FFT mode;
generating a plurality of GI (guard interval) mode division signals from different delay signals that are each the correlation signal delayed by a respective delay;
determining a respective peak-value position and a respective peak-value for each of the GI mode division signals; and
determining the FFT mode and a GI mode for the I/Q stream using the respective peak-values and the respective peak-value positions for the GI mode division signals,
wherein the correlation signal is generated depending on the FFT mode as indicated by a FFT mode signal from a decision unit,
and wherein the GI mode division signals are generated by a multi-sliding integrator without the FFT mode signal being directly fed-back to the multi-sliding integrator,
and wherein the step of generating the correlation signal comprises:
sampling the I/Q stream by 1/M to generate a decimated I/Q stream; and
selecting one of the decimated I/Q stream and the I/Q stream depending on the FFT mode to generate a selected I/Q stream.

14. The method of claim 13, wherein each GI mode division signal corresponds to a respective possible GI mode of the I/Q stream.

15. The method of claim 13, further comprising:
determining a GI peak-value and a GI peak-value position for the I/Q stream using the respective peak-values and the respective peak-value positions for the GI mode division signals.

16. The method of claim 13, wherein generating the plurality of GI mode division signals comprises:

generating a first delay signal, a second delay signal, a third delay signal, and a fourth delay signal, each delay signal being the correlation signal delayed by a respective delay;
combining the first delay signal and the correlation signal to generate a first combined signal that is further combined with a previous first GI mode division signal to generate a current first GI mode division signal;
combining the second delay signal and the correlation signal to generate a second combined signal that is further combined with a previous second GI mode division signal to generate a current second GI mode division signal;
combining the third delay signal and the correlation signal to generate a third combined signal that is further combined with a previous third GI mode division signal to generate a current third GI mode division signal; and
combining the fourth delay signal and the correlation signal to obtain a fourth combined signal that is further combined with a previous fourth GI mode division signal to generate a current fourth GI mode division signal.

17. The method of claim 16, wherein the first, second, third, and fourth delay signals are generated by delaying the correlation signal by time periods of 64, 128, 256, and 512 samples, respectively.

18. The method of claim 15, wherein determining the respective peak-value position and the respective peak-value for a GI mode division signal comprises:
generating complex magnitudes of the GI mode division signal;
detecting the respective peak-value position where a peak value is in the complex magnitudes;
passing-through a portion of the GI mode division signal that corresponds to the peak-value position to generate a pass-through signal;
combining the pass-through signal and a previous interim result to generate an adder output;
delaying the adder output to generate a delayed adder output that acts as the previous interim result for a next pass-through signal; and
generating the respective peak-value as a complex magnitude of the delayed adder output.

19. The method of claim 18, wherein determining the FFT mode includes:
determining the FFT mode using one of the respective peak-values of the GI mode division signals.

20. The method of claim 19, wherein the respective peak-value used for determining the FFT mode is for the GI mode division signal corresponding to a GI of ⅙.

21. The method of claim 13, wherein determining the GI mode includes:
determining the GI peak value and the GI mode from a maximum of the respective peak-values; and
determining the GI peak-value position by selecting one of the respective peak-value positions corresponding to the maximum of the respective peak-values.

22. The method of claim 21, wherein the FFT mode is one of a 2K mode or an 8K mode, and wherein the GI mode is one of ¼, ⅛, 1/16, or 1/32, , within a DVB-T (terrestrial digital video broadcasting) receiver.

23. The method of claim 13, wherein generating the correlation signal comprises:
delaying the selected I/Q stream to generate a delayed I/Q stream; and
multiplying the selected I/Q stream and the delayed I/Q stream to generate the correlation signal.

24. A method of determining modes within a receiver, comprising:

generating a correlation signal from an in-phase and quadrature (I/Q) stream depending on a FFT mode;

generating a plurality of GI (guard interval) mode division signals from different delay signals that are each the correlation signal delayed by a respective delay;

determining a respective peak-value position and a respective peak-value for each of the GI mode division signals; and determining the FFT mode and a GI mode for the I/Q stream using the respective peak-values and the respective peak-value positions for the GI mode division signals;

wherein generating the correlation signal comprises:

sampling the I/Q stream by 1/M to generate a decimated I/Q stream;

selecting one of the decimated I/Q stream and the I/Q stream depending on the FFT mode to generate a selected I/Q stream;

delaying the selected I/Q stream to generate a delayed I/Q stream; and multiplying the selected I/Q stream and the delayed I/Q stream to generate the correlation signal.

25. The method of claim 24, wherein M is 4.

* * * * *